United States Patent
Du et al.

(10) Patent No.: US 9,412,401 B2
(45) Date of Patent: Aug. 9, 2016

(54) DATA READER MAGNETIC SHIELD WITH COFENIB MATERIAL

(71) Applicant: Seagate Technology LLC, Cupertino, CA (US)

(72) Inventors: Yuqing Du, Londonderry (GB); Sameh Sayed Ali Hassan, Londonderry (GB); Kevin A. McNeill, Derry (IE); Aidan Goggin, Redcastle (IE); Marcus W. Ormston, Derry (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/711,597

(22) Filed: May 13, 2015

(65) Prior Publication Data

US 2015/0332713 A1 Nov. 19, 2015

Related U.S. Application Data

(60) Provisional application No. 61/992,516, filed on May 13, 2014.

(51) Int. Cl.
*G11B 5/39* (2006.01)
*G11B 5/11* (2006.01)

(52) U.S. Cl.
CPC ............ *G11B 5/3912* (2013.01); *G11B 5/3954* (2013.01); *G11B 2005/3996* (2013.01); *Y10T 29/49034* (2015.01)

(58) Field of Classification Search
None
See application file for complete search history.

(56) References Cited

U.S. PATENT DOCUMENTS

| | | | |
|---|---|---|---|
| 5,838,521 A | 11/1998 | Ravipati | |
| 6,074,743 A | 6/2000 | Araki et al. | |
| 6,496,335 B2 | 12/2002 | Gill | |
| 7,738,287 B2 | 6/2010 | Diao et al. | |
| 8,437,105 B2 | 5/2013 | Vas'ko et al. | |
| 8,451,567 B2 | 5/2013 | Zhou et al. | |
| 8,462,467 B2 | 6/2013 | Yanagisawa et al. | |
| 8,514,524 B2 | 8/2013 | Wu et al. | |
| 9,001,473 B1* | 4/2015 | Gao ............... | G11B 5/3912 360/324.11 |
| 2007/0211391 A1* | 9/2007 | Hirata ............ | G11B 5/3912 360/319 |
| 2010/0067148 A1 | 3/2010 | Tsuchiya et al. | |
| 2012/0250189 A1 | 10/2012 | Degawa et al. | |
| 2012/0327537 A1 | 12/2012 | Singleton et al. | |
| 2013/0130167 A1 | 5/2013 | Hidaka | |
| 2013/0230741 A1 | 9/2013 | Wang et al. | |
| 2013/0270523 A1 | 10/2013 | Wang et al. | |
| 2015/0029610 A1* | 1/2015 | Okawa ............ | G11B 5/3909 360/75 |
| 2015/0243307 A1* | 8/2015 | Lu ................. | G11B 5/3912 360/319 |

* cited by examiner

*Primary Examiner* — Craig A. Renner
(74) *Attorney, Agent, or Firm* — Hall Estill Attorneys at Law

(57) ABSTRACT

A data storage device may be configured at least with a magnetic stack that contacts a magnetic shield. The magnetic stack can be disposed between first and second side shields and having at least one layer constructed of a CoFeNiB material. The magnetic shield may have a synthetic antiferromagnet with a non-magnetic layer disposed between first and second ferromagnetic layers.

15 Claims, 7 Drawing Sheets

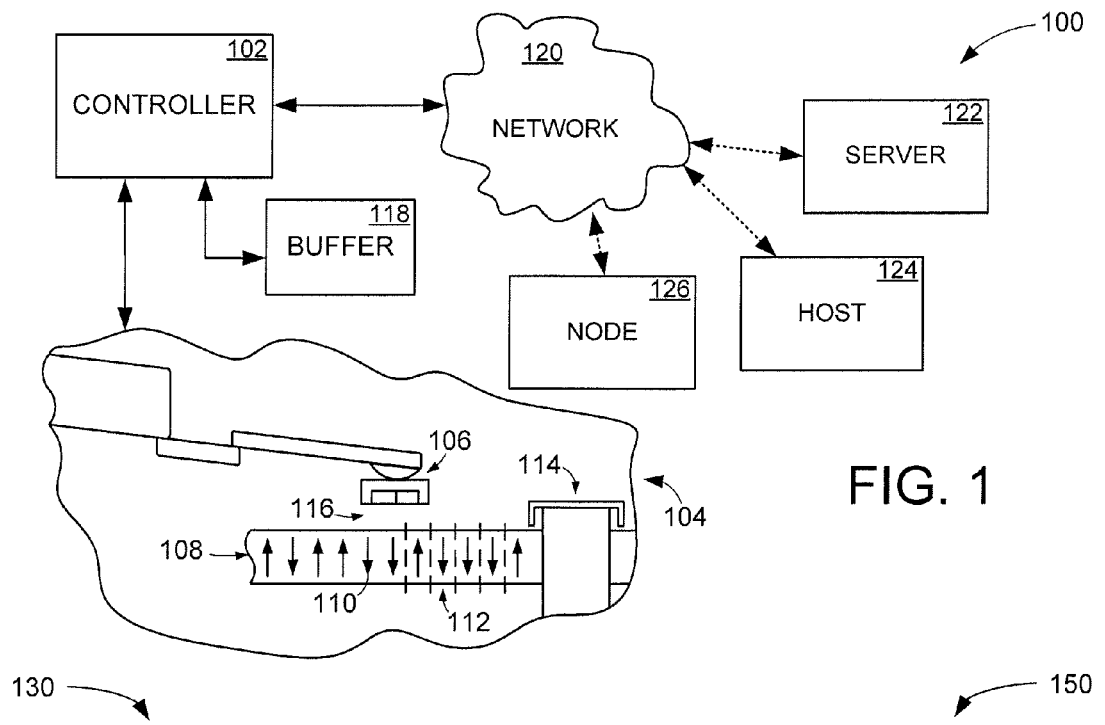
FIG. 1
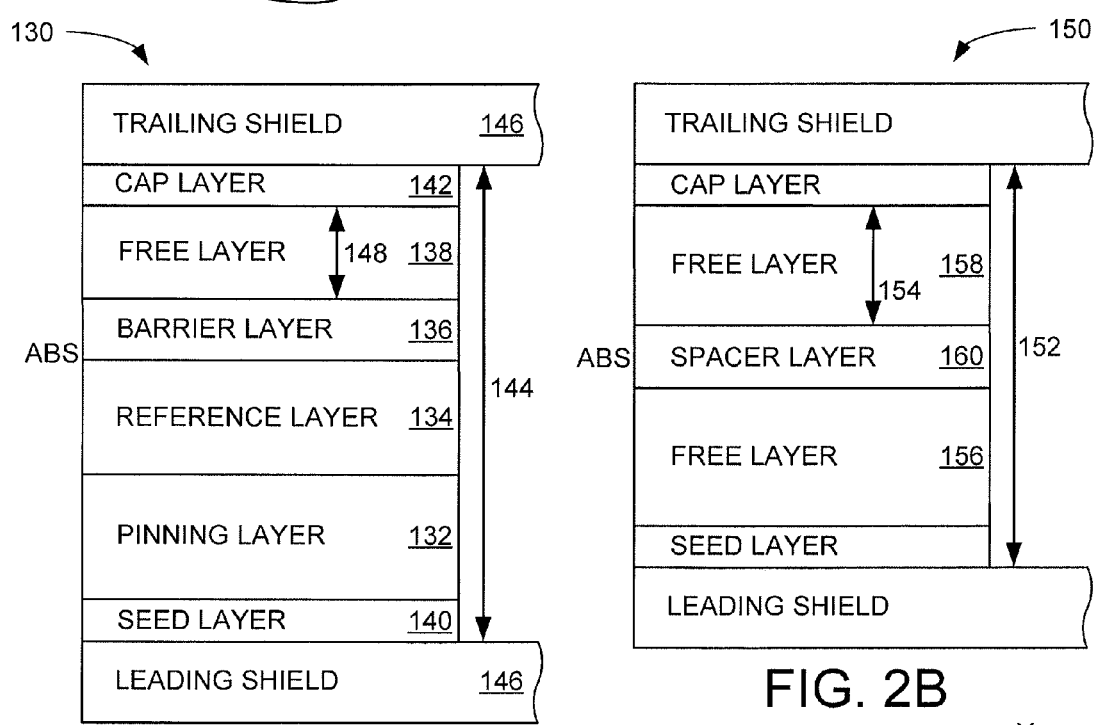
FIG. 2A
FIG. 2B
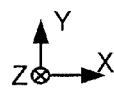

DATA READER MAGNETIC SHIELD WITH COFENIB MATERIAL

RELATED APPLICATION

The present application makes a claim of domestic priority to U.S. Provisional Patent Application No. 61/992,516 filed May 13, 2014, the contents of which are hereby incorporated by reference.

SUMMARY

Various embodiments may configure a magnetic stack to contact a magnetic shield with the magnetic shield having at least one layer formed of a CoFeNiB material.

BRIEF DESCRIPTION OF THE DRAWINGS

FIG. 1 is a block representation of an example portion of a data storage system configured and operated in accordance with some embodiments.

FIGS. 2A and 2B respectively show cross-sectional view block representations of portions of example data readers capable of being utilized in the data storage system of FIG. 1.

DETAILED DESCRIPTION

Figure 3:
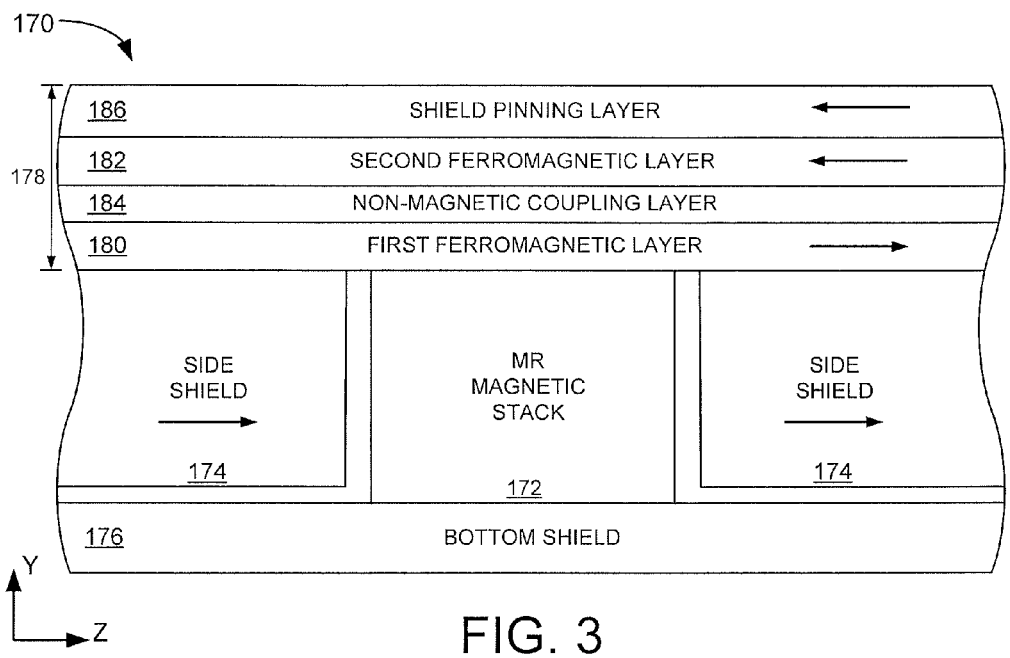
FIG. 3 displays an ABS view block representation of a portion of an example data reader configured in accordance with various embodiments.

Consumer and industry demand for data storage devices that are faster, smaller, and more reliable has emphasized the shielding of various data storage components, such as data writing poles and magnetoresistive data readers. Configuring magnetic shields on a sub-angstrom scale can pose difficulties for shield stability and thermo-mechanical performance. For instance, in small form factor embodiments, a single layer magnetic shield can be prone to magnetic domain movement that jeopardizes the efficiency of the shield and the performance of the data storage device due to increased magnetic noise and unstable magnetic directions. Hence, there is a continued interest in optimizing magnetic shield robustness, especially in reduced form factor shielding environments.

With these issues in mind, a data storage device may be configured with a magnetic stack that contacts a magnetic shield with the magnetic shield having at least one layer formed of a CoFeNiB material. The CoFeNiB material can exhibit increased magnetic moment, anisotropy, and magnetic coupling than other metal alloys, such as NiFe. Such heightened magnetic properties can allow a magnetic shield to be tuned and catered for sub-angstrom scale sizes to maintain shield stability and shield magnetic saturation while increasing magnetic symmetry. In contrast, shields constructed of other metal alloys can be susceptible to stray magnetic fields that cause shield instability and diminished data storage device performance.

It is contemplated that a magnetic shield employing at least one CoFeNiB material layer can be utilized in an unlimited variety of data storage environments. However, assorted embodiments utilize a tuned magnetic shield in the example data storage system 100 of FIG. 1. While not limiting, the data storage system 100 can have one or more local controllers 102 independently and concurrently engaging at least one data storage device 104, as shown by the block representation of a portion of an example data storage device 104. The data storage device 104 can be equipped with at least one transducing head 106 that can respectively be positioned over selected locations on a magnetic storage medium 108, such as over one or more stored data bits 110 that are organized in one or more data tracks 112.

The storage medium 108 can be attached to a spindle motor 114 that rotates the medium 108 to produce an air bearing 116 on which the transducing head 106 flies to access predetermined portion of the medium 108. In this way, the local controller 102 can pass data into and out of the data storage device 104 from one or more volatile or non-volatile local buffers 118 as well as from remote sources connected to the data storage device 104 via a wired or wireless network 120 that is accessed by appropriate protocol. In the non-limiting example shown in FIG. 1, the network 120 allows any number of remote servers 122, hosts 124, and nodes 126 to control, access, and contribute to data storage device 104 operations.

The combination of local and remote access to the data storage device 104 can allow computing systems, such as cloud computing networks, to utilize some or all of the data storage device 104 to increase data access speed and efficiency. Regardless of the speed and efficiency of network and local computing components, the accuracy of data reading and writing operations in the data storage device 104 can determine the performance of the data storage system 100. The ability of one or more magnetic shields to reliably define a magnetic extent for data accessing components, such as the transducing head 106, can determine the data bit resolution of the data storage device 104 and be a factor in the performance potential of the data storage system 100.

FIGS. 2A and 2B respectively illustrate block representations of air bearing surface (ABS) portions of example data readers 130 and 150 as respectively configured in accordance with some embodiments. In FIG. 2A, an abutted junction type magnetoresistive magnetic stack 130 is displayed with a fixed magnetization pinning layer 132 contacting a fixed magnetization reference layer 134 opposite a non-magnetic barrier layer 136 from a magnetically free layer 138. The magnetic stack 130 is configured so that the free layer 138 responds to an external data bit while the reference layer 134 maintains a fixed magnetization due to the exchange coupling with the pinning layer 132. Such interaction between the free 138 and reference 134 layers across the barrier layer 136 can consequently be read as a logic state.

Through various tuned configurations, seed 140 and cap 142 layers can be positioned on opposite sides of the stack 130 to provide predetermined fixed and/or free magnetizations and other magnetic characteristics like grain growth and anisotropy. Construction of the abutted junction type magnetic stack 130 can have a shield-to-shield distance 144 between shields 146 and free layer thickness 148 that factors into the magnetic extent of the magnetic stack 130 and the possible data track resolution of a data storage system. However, the inclusion of the reference 136 and pinning 134 layers can correspond to a smaller free layer thickness 148 and increased shield-to-shield spacing 144, which may induce magnetic volatility and reduce data signal production in the magnetic stack.

The trilayer magnetic stack 150 shown in FIG. 2B may be configured to read external data bits with a reduced shield-to-shield spacing 152 and greater free layer thickness 154 compared to the abutted junction type magnetic stack 130. In operation, the trilayer magnetic stack 150 has first 156 and second 158 magnetically free layers that are separated by a spacer layer 160 and set to default magnetizations by biasing structures external to the trilayer magnetic stack 150. The relocation of any pinned magnetization structures from the stack 150 to elsewhere allow for the reduced physical size 152 compared to the pinning 132 and reference 134 magnetizations of the abutted junction type magnetic stack 130. However, the lack of any pinned magnetization in the trilayer magnetic stack 150 can be difficult to bias properly to read data from densely packed data bits.

It should be noted that an abutted junction type and trilayer magnetic stacks can be utilized interchangeably and are in no way limiting to possible configurations of a data transducer. Regardless of the type of magnetic stack being used, a reduction in the shield-to-shield spacing can stress the magnetic stability of the various magnetic stack layers. Such stress can be mitigated by magnetic shields positioned about the magnetic stack, like leading and trailing shields of FIGS. 2A and 2B, that can absorb and withstand stray magnetic fields from affecting the magnetizations of the various layers of the magnetic stacks 130 and 150.

The relatively low magnetic coercivity of the magnetic shields 146 may be configured to maintain a predetermined magnetization orientation irrespective of the presence of external magnetic fields. However, a bulk magnetic shield having a single layer of magnetic material, such as an NiFe alloy, can be susceptible to magnetic domain movement that interferes with optimized operation of the magnetic stack 130 and 150. Reduction of the physical size of the magnetic stacks 130 and 150 on the ABS and away from the ABS can further exacerbate magnetic volatility of bulk magnetic shields. As such, a more stable magnetic shield that can efficiently absorb and withstand stray magnetic fields, particularly in sub-angstrom scale data storage environments, can increase data sensing accuracy and efficiency.

FIG. 3 illustrates a block representation of an ABS view of an example data reader 170 configured in accordance with various embodiments. The data reader 170 has an MR magnetic stack 172 separated from side shields 174 by an insulating material and positioned between a bottom shield 176 and a top shield 178. While the bottom 176 and top 178 shields may be configured as matching or dissimilar laminations, various embodiments construct the top shield 178 as a synthetic antiferromagnet (SAF) that differs from the single layer of material, such as CoFeNiB, found in the bottom shield 176.

The SAF top shield 178 can be configured to have a fixed magnetization structure with first 180 and second 182 ferromagnetic layers separated by a non-magnetic coupling layer 184 and pinned to opposing magnetization directions by a shield pinning layer 186. As shown by solid arrows, the SAF top shield 178 can maintain predetermined magnetization orientations, such as parallel to the ABS, and magnetization magnitudes that provide a simpler magnetic domain structure compared to a single layer bulk shield, like bottom shield 176. The various SAF top shield 178 layers can be tuned for material and thickness to increase shielding performance by withstanding and absorbing stray magnetic fields more efficiently and reliably.

Contact between the first ferromagnetic layer 180 and the side shields 174 can consequently set the respective side shields to a predetermined magnetization direction and magnitude. The presence of the predetermined magnetization in the top 178 and side 174 shields can optimize magnetic shielding in sub-angstrom scale magnetic stack 172. That is, the magnetic strength and orientation of the various shielding layers can more precisely define a magnetic extent of the magnetic stack 172, which can correspond with greater data bit resolution and reduced data sensing errors. It should be noted that the magnetic stack 172 and side shields 174 are configured with rectangular shapes defined in part by sidewalls aligned along the Y axis, but such configuration is not required or limiting as various aspects of the data reader 170 can be tuned to accommodate diverse data storage environments.

Figure 4:
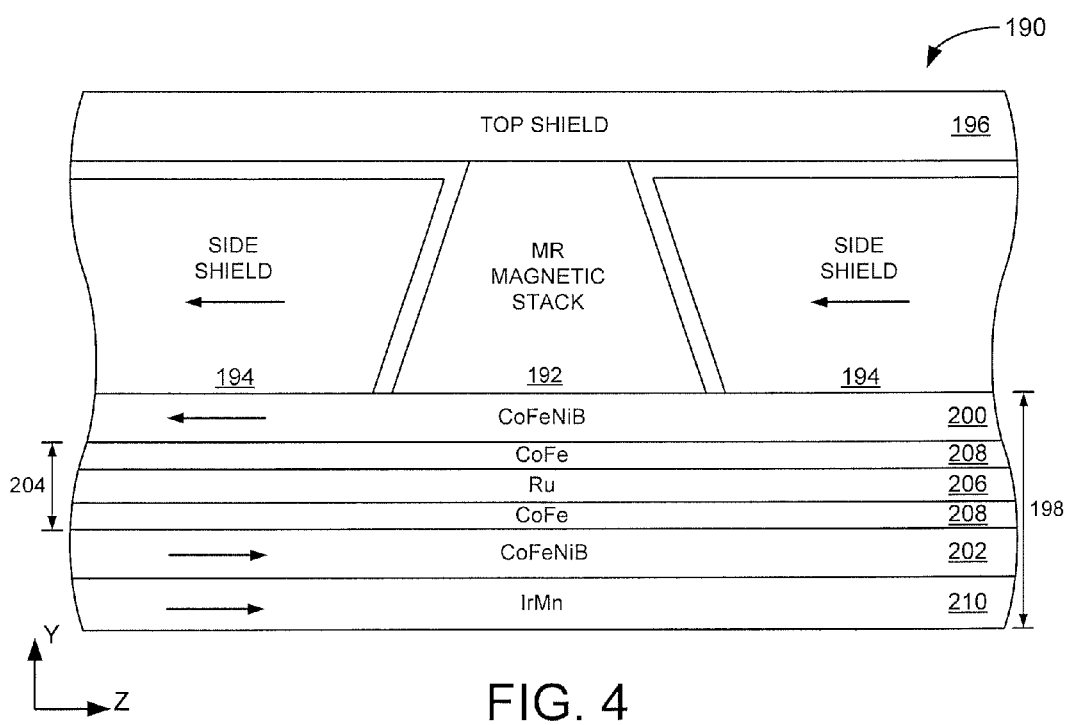
FIG. 4 illustrates an ABS view block representation of a portion of an example data reader constructed and operated in accordance with some embodiments.

FIG. 4 displays an ABS view block representation of a portion of an example data reader 190 tuned in accordance with various embodiments to provide optimized data bit resolution in reduced form factor data storage environments. In comparison with the rectangular shapes illustrated in FIG. 3, the data reader 190 of FIG. 4 has a MR magnetic stack 192 having tapered sidewalls defining a trapezoidal shape. The tapered sidewalls of the magnetic stack 192 can be similar or dissimilar to tapered side shield 194 sidewalls that are separated from the magnetic stack 192 by a uniform or non-uniform layer of insulating material.

The magnetic stack 192 contacts a single layer top shield 196 and a multi-layer SAF bottom shield 198. Although a single layer shield in combination with a SAF lamination shield is shown in FIGS. 3 and 4, such configuration is not required or limiting. It is contemplated that the SAF lamination can be positioned to be proximal a magnetically fixed or free structure of the magnetic stack 192. That is, the top 196 and bottom 198 shields do not limit the structure or configuration of the constituent layers of the magnetic stack 192 and the SAF lamination can contact the magnetic stack 192 proximal a magnetically free or magnetically fixed structure of the magnetic stack 192. It should further be noted that the side shields 194 can be configured with similar or dissimilar materials, numbers of layers, and types of coupling with the top 196 or bottom 198 shields.

The SAF bottom shield 198 can contact the magnetic stack 192 with a first ferromagnetic layer 200 that has a fixed magnetization to pin the side shields 194 and make the shield 198 more robust. The first ferromagnetic layer can be constructed of a CoFeNiB material that is coupled to a second ferromagnetic layer 202 by a non-magnetic coupling structure 204. The coupling structure 204 may be a single layer of non-magnetic material, such as a transition metal or alloy, or a lamination of multiple dissimilar materials. The non-limiting embodiment shown in FIG. 4 depicts a Ru transition metal coupling sub-layer 206 disposed between CoFe material coupling sub-layers 208. The material and thickness of the various layers of the coupling structure 204 can be tuned as similar or dissimilar materials and thicknesses to provide a predetermined coupling strength and magnetic characteristics of the first 200 and second 202 ferromagnetic layers.

The magnetization of the bottom shield 198 can be set by one or more shield pinning layers 210 that may be a high magnetic coercivity permanent magnet, like FePt and CoPt, or an antiferromagnet, such as IrMn, FeMn, and PtMn. The CoFeNiB material of the first 200 and second 202 ferromagnetic layers can complement the utilization of the shield pinning layer 210. CoFeNiB has a relatively large magnetic moment while retaining reasonable magnetic coercivity, higher magnetic anisotropy, and greater SAF coupling compared with ferromagnetic materials like NiFe. In other words, the use of CoFeNiB for one, or both ferromagnetic layers 200 and 202 can allow a reduction in P50, side shield saturation, and bottom shield 198 stability by coupling more strongly to the shield pinning layer 210 than with other ferromagnetic materials like NiFe.

Figure 5:
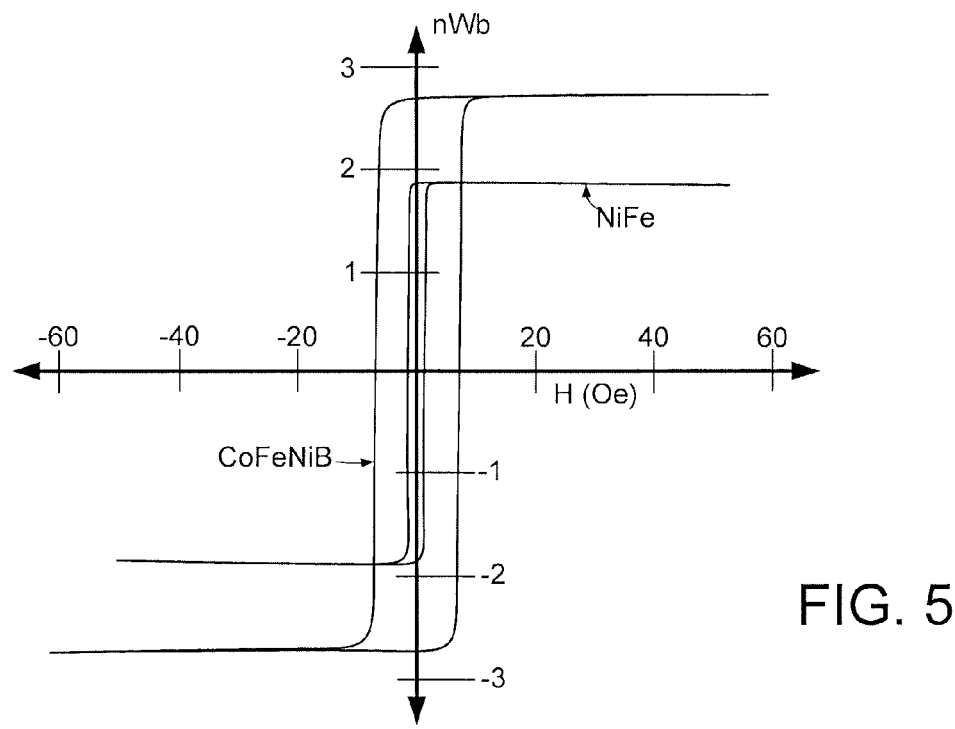
FIG. 5 graphs magnetic characteristics for example data readers configured in accordance with various embodiments.
Figure 6:
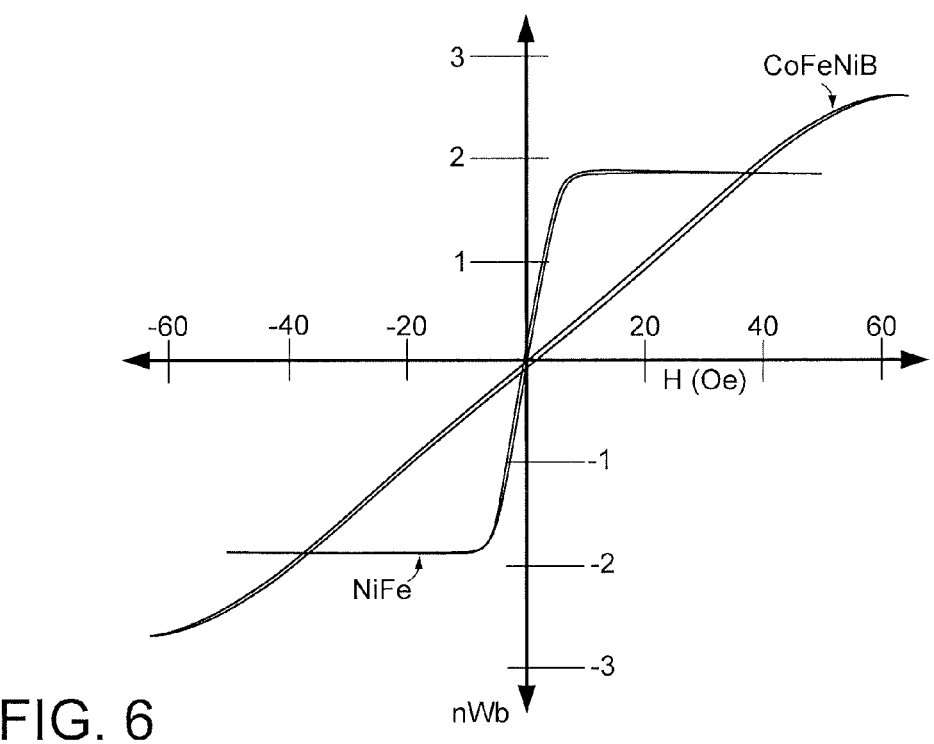
FIG. 6 plots magnetic characteristics for example data readers tuned in accordance with some embodiments.

FIGS. 5 and 6 respectively graph material characteristics for magnetic shields formed with NiFe and CoFeNiB materials in accordance with various embodiments. FIG. 5 displays a B—H looper plot for the easy axis of magnetic shields composed of NiFe and CoFeNiB while FIG. 6 shows a looper plot for the hard axis of magnetic shields constructed of NiFe and CoFeNiB. As can be appreciated, the use of one or more SAF shield layers of CoFeNiB provides a greater magnetic saturation, such as 1.4:1, and greater anisotropy, such as 55:6 Oe, over the use of NiFe material.

These magnetic characteristics illustrate how forming SAF shield layers of CoFeNiB instead of ferromagnetic materials like NiFe can optimize data reader performance. It can be appreciated that the slight increase in magnetostriction for CoFeNiB over NiFe, which can be a $4.7 \times 10^{-6}$ magnetostriction coefficient value, further supports that CoFeNiB can provide increased magnetic shielding performance without jeopardizing magnetic stack reaction to encountered data bits. However, the use of CoFeNiB in SAF shield laminations with two ferromagnetic layers can pose operational difficulties when annealing fields are applied to the magnetic stack, shield, or both. Configuring a SAF shield with three ferromagnetic layers may mitigate such annealing difficulties by providing two different magnetization directions being present in the shield.

Figure 7:
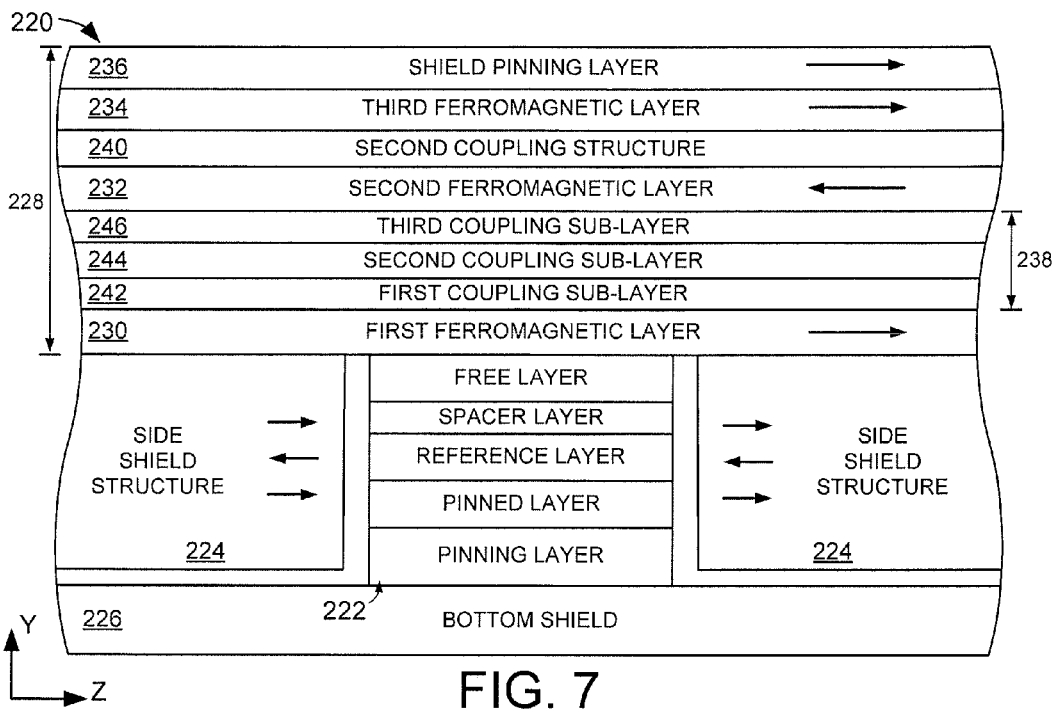
FIG. 7 is an ABS view block representation of a portion of an example data reader configured in accordance with various embodiments.

FIG. 7 displays an ABS view block representation of an example data reader 220 constructed and operated in accordance with some embodiments. The data reader 220 has an abutted junction type MR magnetic stack 222 that has a magnetically free layer separated from a fixed magnetization structure by a non-magnetic spacer layer. The magnetic stack 222 is disposed between side shield structures 224 while portions of the fixed magnetization structure contact a single layer bottom shield 226. Positioning the single layer bottom shield 226 proximal the fixed magnetization structure of the magnetic stack 222 and distal the free layer can allow for a smaller data reader physical size, simpler manufacturing processing, and more efficient saturation of the fixed magnetization structure compared to a shield lamination.

In contrast to the single layer bottom shield 226, the top shield 228 is configured as a multi-layer SAF lamination with first 230, second 232, and third 234 ferromagnetic layers that are set to a predetermined magnetization orientation, as displayed with the solid arrows, by a shield pinning layer 236. The triple ferromagnetic layers 230, 232, and 234 can provide precise control of magnetization direction that can be proliferated through the multiple side shield layers, as shown by the solid arrows of the respective side shields 224.

With the magnetization direction being tuned through material and thickness selection along the Y axis, the magnetic strength of the various magnetizations of the top shield 228 can be dictated by the size and configuration of the first 238 and second 240 coupling structures. The first coupling structure 238 has first 242, second 244, and third 246 coupling sub-layers while the second 240 coupling structure is configured as a single layer of non-magnetic material. In various embodiments, the first 238 and second 240 coupling structures are formed of similar or dissimilar transition metal materials while other embodiments have one coupling structure formed of a non-magnetic alloy and another structure constructed with a transition metal material.

By tuning the size, number of layers, and materials of the coupling structures 238 and 240, the magnetic coupling strength between the ferromagnetic layers 230, 232, and 234 and the shield pinning layer 236 can be set to an optimized value. For example, the coupling structures 238 and 240 can be configured as laminations of materials with materials that withstand and absorb stray magnetic fields efficiently while setting the side shields 224 to a predetermined magnetization direction and strength. The efficient biasing of the respective side shields 224 can be difficult as the magnetization strength should be a balance between shielding characteristics and risk of inadvertently altering the magnetic stack's 222 reaction to encountered data bits.

Figure 8:
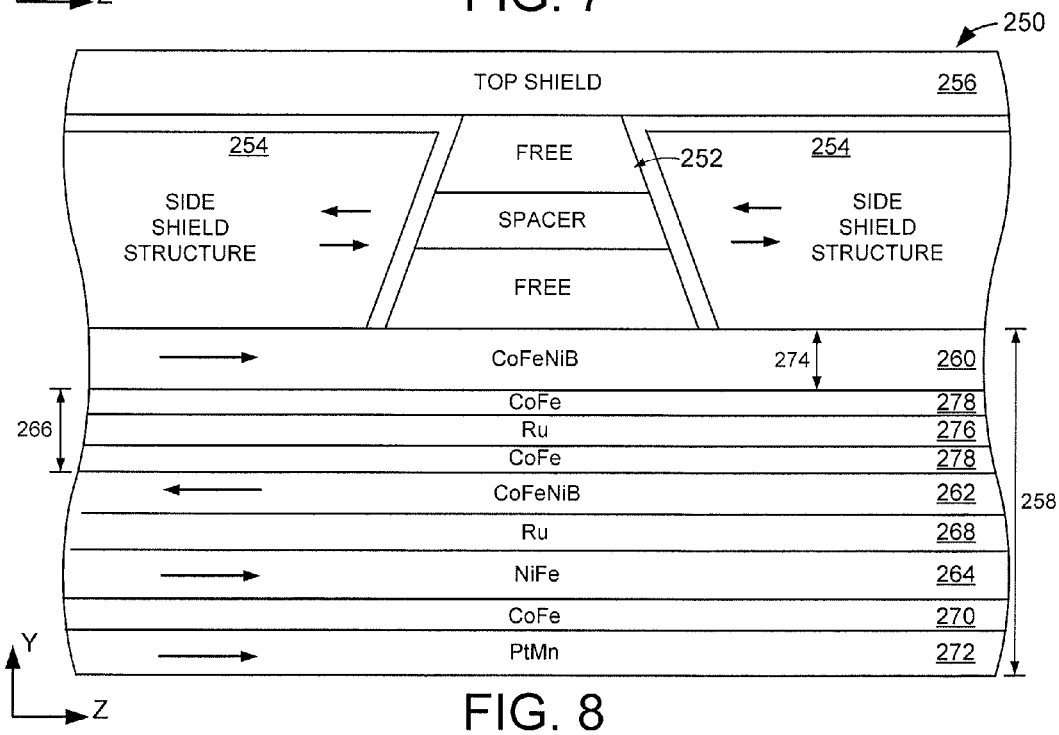
FIG. 8 shows an ABS view block representation of a portion of an example data reader constructed and operated in accordance with some embodiments.

FIG. 8 shows an ABS view block representation of a portion of an example data reader 250 constructed with non-limiting materials in accordance with some embodiments. A trilayer magnetic stack 252 has dual free layers separated by a non-magnetic spacer layer without having a fixed magnetization structure contacting the magnetic stack 252 on the ABS. The magnetic stack 252 is laterally separated, along the Z axis, by side shield structures 254 that may be single layers of material or laminations of multiple materials. The magnetic stack 252 is contactingly disposed between a top shield 256 and a SAF bottom shield 258. It is contemplated that although a single layer top shield 256 is shown in FIG. 8, another shield lamination may be utilized in combination with the bottom shield 258 and be configured to have similar or dissimilar numbers of layers, materials, and magnetic characteristics compared to the bottom shields 258.

The bottom shield 258 is constructed with first 260, second 262, and third 264 ferromagnetic layers comprising dissimilar materials. Various embodiments tune multiple ferromagnetic layers of CoFeNiB while other embodiments form one ferromagnetic layer of CoFeNiB and the other ferromagnetic layers of similar or dissimilar materials. The configuration of a CoFeNiB material ferromagnetic layer in contact with the magnetic stack 252 and side shields 254, as shown in FIG. 8, can provide optimized shielding characteristics for the data reader 250 due to the increased magnetic coupling, higher magnetic moment, and greater magnetic anisotropy compared to other ferromagnetic materials like NiFe.

The concurrent use of materials with different magnetostrictions and magnetic moments, like CoFeNiB compared with other ferromagnetic materials, in the bottom shield 258 can further tune the magnetic properties of the bottom shield 258 and provide predetermined magnetic orientation and strength to the side shields 254. The material tuning of the ferromagnetic layers 260, 262, and 264 can be complemented by tuned coupling structures 266, 268, and 270 that are constructed as one or more layers of non-magnetic material that control the magnetic coupling from the shield pinning layer 272 throughout the bottom shield 258. Such tuned coupling structures 266, 268, and 270 can be combined with an increased first ferromagnetic layer thickness 274 along the Y axis to control the amount of magnetic coupling between the side shields 254, magnetic stack 252, and bottom shield 258. For example, a transition metal material layer 276 can be disposed between magnetic coupling sub-layers 178 to control the coupling between the first 260 and second 262 ferromagnetic layers.

Through the tuning of the materials of the respective ferromagnetic layers and coupling structures, multiple magnetizations oriented in opposite directions along the Z axis, parallel to the ABS, can be present in the bottom shield 258. In comparison with the dual ferromagnetic layer shields of data readers 170 and 190, having three ferromagnetic layers 260, 262, and 264 allows annealing fields to be applied that reinforce the magnetic orientation of the bottom shield 258, instead of fighting the natural magnetic orientations. A non-limiting example further tunes the bottom shield 258 to provide the same magnetic orientation to the side shields 254 as the shield pinning layer 272 and annealing direction, which can result in more robust side shielding.

Figure 9:
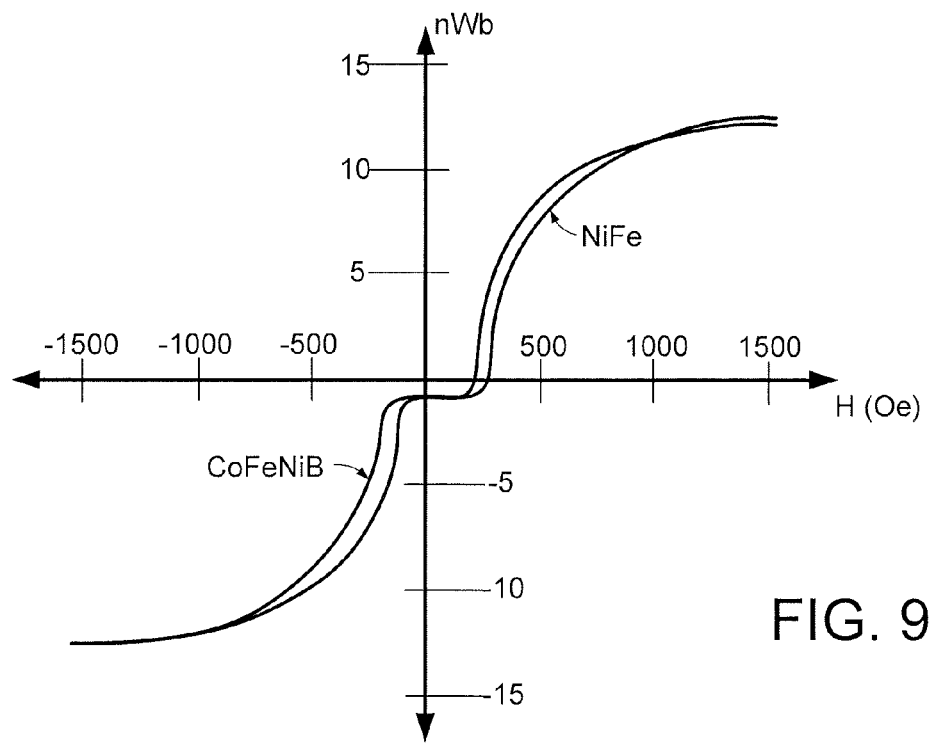
FIG. 9 graphs magnetic characteristics for example data readers configured in accordance with various embodiments.
Figure 10:
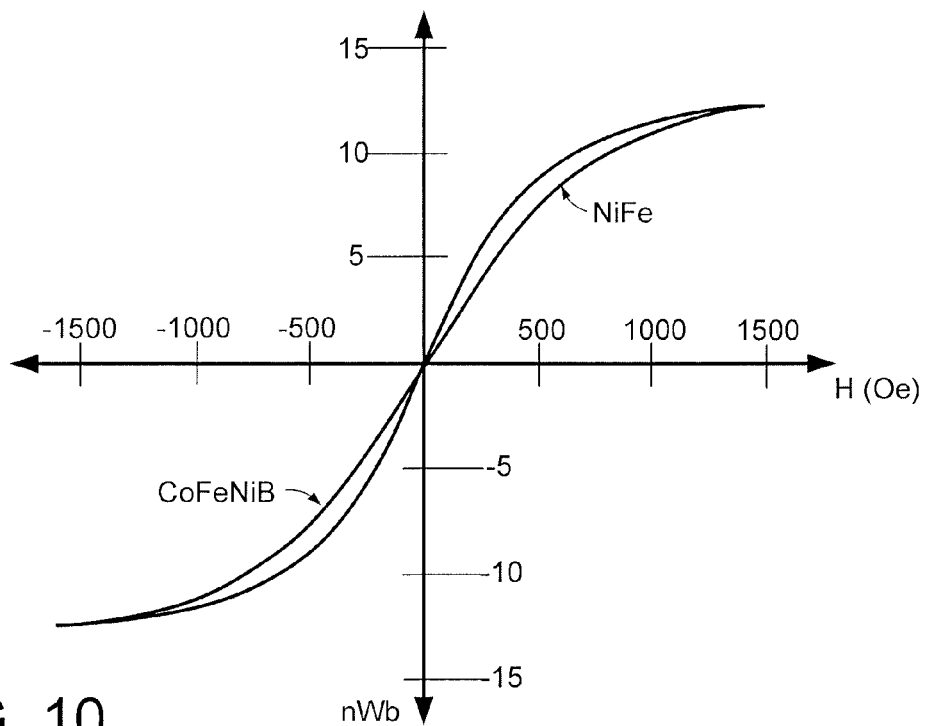
FIG. 10 plots magnetic characteristics for example data readers tuned in accordance with some embodiments.

FIGS. 9 and 10 respectively graph magnetic characteristics of example SAF shield laminations tuned with multiple CoFeNiB ferromagnetic layers or multiple NiFe ferromagnetic layers. FIG. 9 plots the easy magnetic axis while FIG. 10 plots the hard magnetic axis for the SAF shield laminations. It can be appreciated that the CoFeNiB containing SAF shield has greater optimized magnetic saturation field and magnetic coupling. Such optimized magnetic characteristics for the CoFeNiB containing shield can reduce P50 for a data reader and heighten magnetic stability of the top/bottom and side shields. Hence, a simple change of NiFe ferromagnetic layer construction to CoFeNiB construction can increase data reader performance for dual or triple ferromagnetic layer SAF shield laminations.

Figure 11:
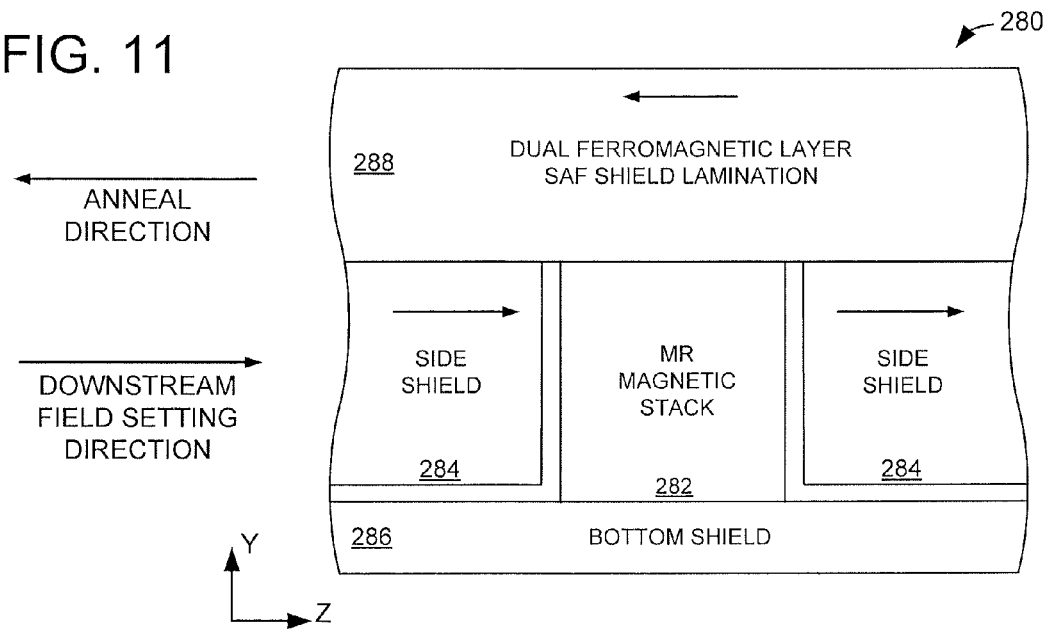
FIG. 11 illustrates an ABS view block representation of a portion of an example data reader configured in accordance with various embodiments.

FIG. 11 illustrates an ABS view block representation of a portion of an example data reader 280 that is tuned in accordance with various embodiments. The data reader 280 has a magnetic stack 282 disposed between side shields 284 as well as between a single layer bottom shield 286 and a dual ferromagnetic layer SAF lamination top shield 288. It is noted that the data reader 280 may be configured with trapezoidal shaped magnetic stack 282 and a bottom shield lamination without limitation. Regardless of the shape and configuration of the bottom shield 286, a magnetic field can be applied downstream to set the magnetic direction of at least the side shields, as illustrated by the solid arrows in the side shields 284.

The downstream field setting condition may be conducted during manufacturing and may be done alone or in combination with other magnetization setting conditions, such as magnetic stack annealing and fixed magnetization structure field setting. One or more annealing conditions may be conducted before and after the downstream field setting. An annealing condition is not limited to a particular process or procedure as magnetic fields and temperature can be elevated and reduced, at will, to control and set various structural and operational characteristics of the data reader 280, such as anisotropy and easy magnetic axis.

With at least one annealing condition setting the shield pinning layer of the top shield 288 in a predetermined direction, such as the direction indicated by the solid arrow, the annealing condition can oppose, counteract, and disrupt the magnetization orientation of the side shields. That is, two ferromagnetic layers of the top shield 288 are to be pinned in opposite directions by the shield pinning layer to support the predetermined side shield magnetization orientation and the annealing condition used to set the shield pinning layer can oppose the preexisting side shield magnetization orientation. However, configuring a SAF shield with three ferromagnetic layers can mitigate such side shield magnetization disruption.

Figure 12:
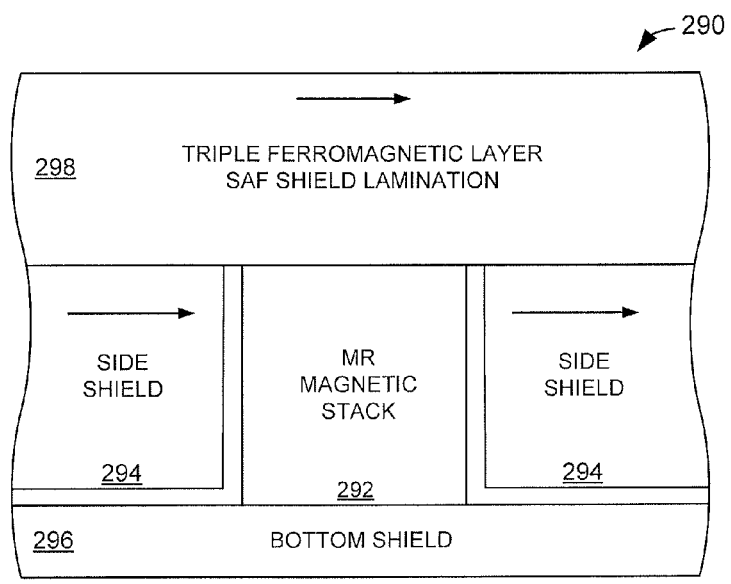
FIG. 12 displays an ABS view block representation of a portion of an example data reader constructed and operated in accordance with some embodiments.

FIG. 12 displays an ABS view block representation of a portion of another example data reader 290 configured in accordance with various embodiments. The data reader 290 has a magnetic stack 292 disposed between side shields 294 and between bottom 296 and top shields. The top shield 298 is configured as a SAF lamination with three ferromagnetic layers coupled to one of two magnetic orientations aligned along the Z axis. As generally illustrated in FIGS. 7 and 8, three ferromagnetic layers in a SAF shield can orient the magnetization direction of the shield pinning layer with the side shields. Such similar magnetization orientations allow the downstream field setting direction and annealing direction to be aligned in the same direction.

It is contemplated that the magnetic stack is annealed concurrently with or subsequently to the SAF shield annealing condition. A magnetic stack annealing condition may involve a magnetic field being applied in a non-normal direction, as shown by angle $\theta_1$. A non-normal direction is hereby meant to mean a direction angled other than 0°, 90°, or 180° with respect to the ABS and Z axis.

The canted magnetic stack annealing can create unwanted magnetic torque between the fixed magnetization structure of the magnetic stack and the SAF shield. The tuned configuration of a triple ferromagnetic layer SAF shield can reduce magnetic torque between a pinned layer of the magnetic stack and the SAF shield by orienting the shield pinning layer's magnetization in the same direction as the reference layer of the magnetic stack 222. In contrast, a SAF shield having two ferromagnetic layers, as displayed in FIG. 11, can have opposing shield pinning layer and magnetic stack pinning layer magnetizations, which can be susceptible to detrimental torque during stack and shield annealing conditions.

Figure 13:
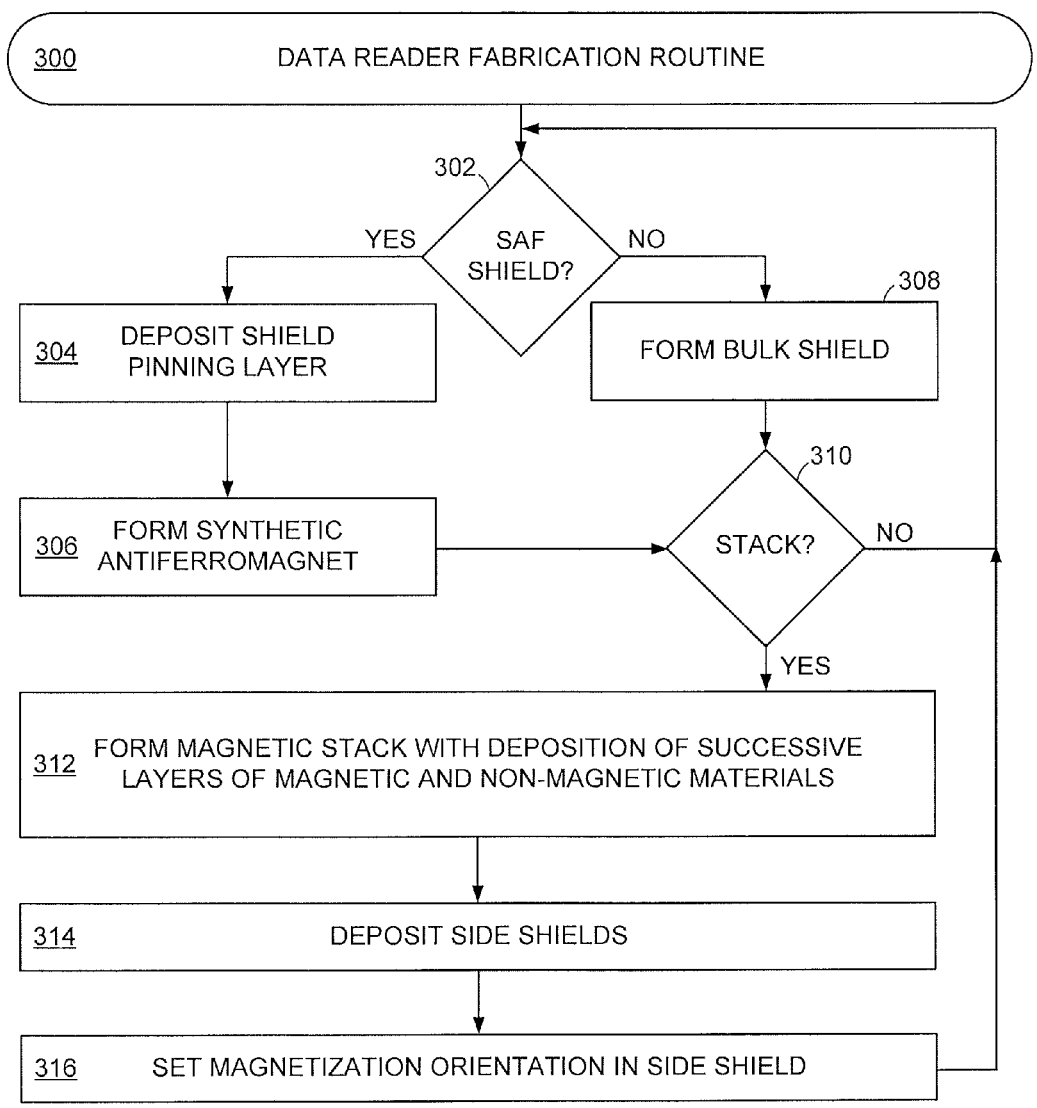
FIG. 13 is a flowchart for an example data reader fabrication routine that may be carried out in accordance with various embodiments.

It should be noted that although a variety of different magnetic stack and shielding configurations have been generally discussed herein; none of the embodiments shown in the drawings are required or limiting. For example, the triple ferromagnetic layer top shield 228 can be used in combination with the trapezoidal shaped magnetic stack 252, laminated side shields, two ferromagnetic layer bottom shield 198, and three ferromagnetic layer bottom shield 258 without limitation. FIG. 13 provides an example data reader fabrication routine 300 that can be carried out in accordance with various embodiments to manufacture one or more data readers.

The routine 300 can begin by determining if a bottom shield is to be a SAF lamination in decision 302. If a SAF shield lamination is to be formed, step 304 proceeds to deposit a shield pinning layer on an underlying substrate before step 306 forms a synthetic antiferromagnet atop the shield pinning layer with a predetermined number of ferromagnetic layers, such as two or three. It is contemplated that step 306 deposits magnetic and non-magnetic layers in a structure other than a synthetic antiferromagnet, such as an exchange coupled ferromagnetic structure. It is also contemplated that step 306 forms at least one non-magnetic coupling structure, which may be between ferromagnetic layers of the SAF as well as between the shield pinning layer and the SAF.

In the event a SAF shield is not selected from decision 302, step 308 forms a bulk single layer shield on an underlying substrate. The fabrication of SAF or bulk single layer shield can incur one or more annealing and field setting conditions before decision 310 evaluates the type, size, and material of a magnetic stack to be constructed atop the previously formed bottom shield. Next, step 312 forms a magnetic stack via the deposition of fixed and free magnetization structures separated by a non-magnetic spacer layer. Either concurrently or subsequently, step 314 can deposit one or more side shields laterally adjacent, but separated from, the magnetic stack. The side shields may then be set to a predetermined magnetic orientation by one or more downstream setting fields applied in step 316.

With the bottom shield, magnetic stack, and side shields formed, decision 302 can be revisited to determine if a SAF or bulk shield is to be constructed for a top shield. Much like with the bottom shield, steps 304 and 306 can form a SAF shield with predetermined numbers of ferromagnetic layers, materials, coupling structures, and thicknesses. However, it is noted that for a top shield, steps 304 and 306 are chronologically reversed so that step 304 is deposited atop the subsequently created SAF.

Through the plethora of magnetic stack and shielding configurations discussed herein, data reading performance can be optimized by increasing magnetic shield stability. The tuned construction of at least one SAF shield lamination with CoFeNiB material can allow for controlled structural and operational characteristics that can lead to higher magnetic moment shields without degrading magnetostriction, magnetic saturation, and magnetic coupling. The ability to tune a SAF shield with three ferromagnetic layers further allows a shield pinning layer, shield annealing direction, and side shield to be aligned in a common direction, which can decrease magnetic volatility and unwanted magnetic torque to provide low asymmetry sigma.

While the embodiments herein have been directed to data sensing, it will be appreciated that the claimed aspects can readily be utilized in any number of other applications, including data writers and solid-state data storage device applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a first magnetically free layer of a magnetic stack contacting a first CoFeNiB layer of a magnetic shield, the magnetic shield having a second CoFeNiB layer separated from the first CoFeNiB layer by a coupling structure, the first CoFeNiB layer having a greater thickness than the second CoFeNiB layer, the thickness measured parallel to a direction from the magnetic shield to the magnetic stack.

2. The apparatus of claim 1, wherein the magnetic stack comprises first and second magnetically free layers and no fixed magnetization.

3. The apparatus of claim 1, wherein the magnetic shield comprises a pinning layer and a synthetic antiferromagnet (SAF) comprising the first and second CoFeNiB layers.

4. The apparatus of claim 1, wherein the magnetic shield contacts first and second side shields.

5. An apparatus comprising a magnetic stack contacting first and second magnetic shields, the magnetic stack disposed between and separated from first and second side shields, a first CoFeNiB layer of the first magnetic shield contacting a magnetically free layer of the magnetic stack, a second CoFeNiB layer of the first magnetic shield separated from the first CoFeNiB layer by a first coupling structure, the first CoFeNiB layer having a greater thickness than the second CoFeNiB layer, the thickness measured parallel to a direction from the first magnetic shield to the magnetic stack.

6. The apparatus of claim 5, wherein the first magnetic shield comprises at least one ferromagnetic layer contacting the second CoFeNiB layer.

7. The apparatus of claim 6, wherein the at least one ferromagnetic layer comprises a magnetic material other than CoFeNiB.

8. The apparatus of claim 5, wherein the first coupling structure comprises first, second, and third coupling sub-layers.

9. The apparatus of claim 8, wherein the first and third coupling sub-layers are each magnetic and the second coupling sub-layer is a non-magnetic transition metal.

10. The apparatus of claim 8, wherein the second coupling sub-layer is disposed between the first and third coupling sub-layers.

11. The apparatus of claim 5, wherein the magnetic shield comprises the first CoFeNiB layer, the second CoFeNiB layer, and third and fourth magnetic layers respectively separated by first, second, and third coupling structures, the first coupling structure comprising multiple sub-layers, the second coupling structure comprising a single layer of a transition metal material, and the third coupling structure comprising a single layer of a magnetic material.

12. A method comprising forming a magnetic shield in contact with a magnetic stack on an air bearing surface (ABS), a first CoFeNiB layer of the magnetic shield contacting a magnetically free layer of the magnetic stack and separated from a second CoFeNiB layer of the magnetic shield by a coupling structure, the first CoFeNiB lager having a greater thickness than the second CoFeNiB layer, the thickness measured parallel to a direction from the magnetic shield to the magnetic stack.

13. The method of claim 12, wherein the magnetic shield and magnetic stack are each annealed along a common direction.

14. The method of claim 12, wherein the magnetic stack is annealed in a first direction and the magnetic shield is annealed in a second direction, the second direction angled with respect to the first direction.

15. The method of claim 14, wherein the second direction is non-normal with respect to the first direction.

* * * * *